(12) United States Patent
Kato

(10) Patent No.: US 8,106,359 B2
(45) Date of Patent: Jan. 31, 2012

(54) RADIATION IMAGING APPARATUS

(75) Inventor: Katsushi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/749,387

(22) Filed: Mar. 29, 2010

(65) Prior Publication Data

US 2010/0243894 A1 Sep. 30, 2010

(30) Foreign Application Priority Data

Mar. 31, 2009 (JP) ................................. 2009-086754

(51) Int. Cl.
*G01T 7/00* (2006.01)
(52) U.S. Cl. .................................................. 250/336.1
(58) Field of Classification Search ............... 250/336.1, 250/370.08, 370.15; 378/19
See application file for complete search history.

(56) References Cited

U.S. PATENT DOCUMENTS

| | | | | |
|---|---|---|---|---|
| 4,969,167 A * | 11/1990 | Zupancic et al. | ............... | 378/19 |
| 6,469,312 B2 * | 10/2002 | Agano | ........................... | 250/580 |
| 2003/0010925 A1 * | 1/2003 | Watanabe | ................ | 250/370.15 |
| 2004/0228450 A1 * | 11/2004 | Mueller | ........................ | 378/199 |
| 2005/0117698 A1 * | 6/2005 | Lacey et al. | ..................... | 378/19 |
| 2007/0221859 A1 * | 9/2007 | Nakata | ..................... | 250/370.15 |
| 2007/0284535 A1 * | 12/2007 | Heismann et al. | ........ | 250/370.15 |

FOREIGN PATENT DOCUMENTS

| | | |
|---|---|---|
| JP | 10-177224 A | 6/1998 |
| JP | 11-128211 A | 5/1999 |
| JP | 2003-194951 A | 7/2003 |
| JP | 2005-099674 A | 4/2005 |
| JP | 2005-266693 A | 9/2005 |
| JP | 2006-242702 A | 9/2006 |

* cited by examiner

*Primary Examiner* — David Porta
*Assistant Examiner* — Marcus Taningco
(74) *Attorney, Agent, or Firm* — Canon U.S.A., Inc IP Division

(57) ABSTRACT

A radiation imaging apparatus includes a radiation detector that captures an image of a subject by detecting radiation transmitted through the subject and converting the radiation into an image signal; an electrical component processes the image signal; an interior housing accommodates the radiation detector and the electrical component therein; an exterior member surrounds the interior housing; an air circulating unit is disposed in the interior housing so as to circulate air inside the interior housing; and a cooling unit is disposed inside of the exterior member and outside of the interior housing so as to cool the interior housing.

17 Claims, 12 Drawing Sheets

FIG. 11

| T2>TB? | | T1>TA? | |
|---|---|---|---|
| | | Yes | No |
| Yes | | FAN MOTOR (1213)/ON<br>FAN MOTOR (1230)/OFF | FAN MOTOR (1213)/ON<br>FAN MOTOR (1230)/ON |
| No | | | FAN MOTOR (1213)/OFF<br>FAN MOTOR (1230)/ON |

RADIATION IMAGING APPARATUS

BACKGROUND OF THE INVENTION

1. Field of the Invention

The present invention relates to a radiation imaging apparatus including a radiation detector.

2. Description of the Related Art

An X-ray imaging apparatus using an X-ray as a type of radiation has been widely used, for example, in the fields of industrial nondestructive inspection or medical diagnosis. In a conventional X-ray imaging apparatus, a subject to be imaged is placed between an X-ray generation unit and an imaging unit having a built-in X-ray detector. In other words, the X-ray generation unit and the imaging unit face each other on opposite sides of the subject. The X-ray generation unit irradiates the subject with controlled amounts of X-ray radiation, and the imaging unit detects the X-ray radiation which is transmitted through the subject and received by the X-ray detector to obtain image information (an image signal).

In recent years, with the development of digital technology, digital X-ray detectors using various image sensors which convert the detected X-ray to an electrical signal have been remarkably advanced. The X-ray imaging apparatus having the digital X-ray detector is currently employed in many facilities instead of an imaging apparatus which performs analog imaging by a conventional film/screen technique using a phosphor and a photosensitive film.

A flat detector (a flat panel) as a representative X-ray detector which processes a digital signal is generally configured with a combination of a phosphor which converts the X-ray to visible light, a photoelectric conversion element, and a photoelectric conversion panel in which pixels having switching elements are disposed in a two-dimensional matrix array form. The X-ray irradiated to the X-ray detector is converted to visible light by the phosphor and then to electrical charges by each pixel. The electric charges (the electrical signal) are read from each pixel and are output as the image signal.

In recent years, with the spread of the digital X-ray detector, requirements for technical problems such as miniaturization of the X-ray imaging apparatus, image quality improvement of the captured image, stability of the image have become all the more severe. As a consideration point for satisfying the requirements, there is heat generation of electrical components which are used inside the apparatus and dispensable for digitalization, and a heat dissipation unit which efficiently dissipates heat is required. Heat dissipation is required not only to assure a normal operation and durability of the electrical components, but also to prevent or minimize an inside temperature rise of the X-ray imaging apparatus from changing characteristics of the X-ray detector.

Heat dissipation techniques for cooling an electronic device contained within a housing structure are known. For example, a known heat dissipation technique of a forced ventilation air-cooling type introduces external air while discharging high-temperature air from inside the housing to cool a device disposed inside the housing. According to this technique, it is difficult to prevent foreign substances from entering inside the housing during operation of the device because a ventilation hole is provided where a cooling unit resides. Since a ventilation hole is typically formed in a part of an exterior member thereof for ventilation, light and moisture can easily enter from the outside.

In an X-ray imaging apparatus, it is highly preferable that the X-ray detector detects only light converted from the X-ray by the phosphor, so as to output the image signal with low noise. Therefore, in the X-ray imaging apparatus, it is undesirable that unnecessary light (e.g., ambient light) does not enter into the neighborhood of the X-ray detector. Generally, the housing plays an important role of shielding electromagnetic noise through the exterior member. However, when an opening such as the ventilation hole is formed in the housing, a route through which the electromagnetic noise enters is formed. Therefore, driving of internal electric circuits may be disturbed. For these reasons, it is undesirable that the opening is formed in the exterior member of the X-ray imaging apparatus which is operating.

In an attempt to address the above-described issues, Japanese Patent Application Laid-Open No. 10-177224 proposes a technique in which a shutter for opening and closing the ventilation hole is disposed on the inside of the ventilation hole, and a fan is disposed on the inside thereof. It is sufficiently effective to use the technique in an X-ray imaging apparatus for taking a still image in which in a driving period of the X-ray imaging apparatus, a time taken for actual imaging operation is very short. However, when external air is introduced into the inside of the X-ray imaging apparatus, moisture or dust is also inevitably introduced at the same time. The moisture or dust introduced into the inside accelerates deterioration of the phosphor or semiconductor devices of the X-ray detector. Further, the accumulated dust may become an obstacle to heat dissipation of the electrical components.

As one of countermeasures for solving the dust issue, an air filter made of a porous synthetic resin-based material may be disposed in the ventilation hole for introducing external air. However, it is ineffective in solving the moisture issue, and since a time and effort for maintenance for cleaning or replacing the air filter are required, it is inconvenient.

An X-ray imaging apparatus as illustrated in FIG. 12 has been disclosed to address the above-discussed issues.

FIG. 12 is a view illustrating an example of a schematic configuration of an imaging unit of a conventional X-ray imaging apparatus. Particularly, in an imaging unit 1200, disposed are a housing (a box) which includes an X-ray detector 1201 and electrical components 1204 thereinside and is almost hermetically sealed and a fan motor 1213 for ventilation which is disposed inside an exterior member which is the outside of the housing as an appearance member.

An X-ray irradiated from an X-ray generation unit (not illustrated) is incident on the X-ray detector 1201 in a direction indicated by the X-RAY arrow. The X-ray detector 1201 converts the incident X-ray to an electrical signal (an image signal). The image signal is input to a signal processing substrate 1203 from the X-ray detector 1201 via a flexible cable 1202. On the signal processing substrate 1203, plural electrical components 1204 are mounted. The electrical components 1204 are configured to process the image signal input from the X-ray detector 1201 and to the X-ray detector 1201.

Accordingly, the electrical components 1204 serve as the main heat generation sources in the imaging unit 1200. As a heat dissipation unit for preventing generated heat from being concentrated, a thermal conduction sheet 1205, a thermal conduction member 1206, and a heat dissipation frame 1207 are disposed to configure a heat transfer route.

The thermal conduction sheet 1205 is composed of, for example, an elastic body sheet made of silicone rubber that transmits the heat of the electrical component 1204 to the thermal conduction member 1206. The thermal conduction member 1206 is made of, for example, a material with high thermal conductivity such as copper or aluminum that efficiently transmits the heat to the heat dissipation frame 1207. Further, when the amount of heat generation is large, as the thermal conduction member 1206, a special thermal conduction tool such as a heat pipe or a component using a graphite material may be used. The heat dissipation frame 1207 is a member that spreads heat transferred from the thermal conduction member 1206 and transmits heat by the convective flow of air or heat radiation, and discharges the heat. The thermal conduction member 1206 also forms part of a frame of the housing structure.

A detector frame 1208 includes the X-ray detector 1201 and the signal processing substrate 1203 therein and holds the X-ray detector 1201 and the signal processing substrate 1203 via members which are not illustrated. The detector frame 1208 is made of metal with electrical conductivity such as iron, stainless steel or aluminum. The detector frame 1208 also serves to protect the X-ray detector 1201 and the electrical components 1204 which are included therein from external electrical noise and prevents internal electromagnetic waves from being emitted to the surrounding environment.

An X-ray transmitting portion cover 1209 transmits the X-ray so that the X-ray cannot deteriorate and protects the X-ray detector 1201. As the X-ray transmitting portion cover 1209, a carbon sheet made of a material with high X-ray transmittance or a thin aluminum sheet is used. The heat dissipation frame 1207, the detector frame 1208, and the X-ray transmitting portion cover 1209 are combined to form the housing structure and are configured to almost hermetically seal a space including the X-ray detector 1201, the signal processing substrate 1203, and the electrical components 1204. Therefore, external light does not reach a photosensitive portion of the X-ray detector 1201, and moisture and dust are prevented from entering into the neighborhood of the X-ray detector 1201 and the signal processing substrate 1203. Further, an effect of shielding from intrusion of the electrical noise and emission of the electromagnetic wave can be increased.

An exterior cover 1210 is disposed on the outside of the detector frame 1208 as a member which constitutes an appearance of the imaging unit 1200. The exterior cover 1210 is coupled to the detector frame 1208 via a portion which is not illustrated to support the detector frame 1208. The exterior cover 1210 is supported from the outside via a mechanism which is not illustrated. In the exterior cover 1210, ventilation holes 1211 and 1212 are formed. The fan motor 1213 is disposed at a position adjacent to the ventilation hole 1211. The fan motor 1213 performs a blowing operation for discharging air in the imaging unit 1200 through the ventilation hole 1211. The ventilation hole 1212 serves to take air outside the imaging unit 1200 into the inside.

Heat inside the housing is spread around the heat dissipation frame 1207 and transferred to contacting air from a surface of the outside of the housing. Accordingly, the air flows in a direction illustrated by an arrow B, moved by the fan motor 1213, and is discharged to the outside of the imaging unit 1200 through the ventilation hole 1211.

Since the ventilation holes 1211 and 1212 are formed in the exterior cover 1210, the external light, moisture, or dust may be introduced into the imaging unit 1200. However, it is configured to prevent the external light, moisture, or dust from being introduced up to the inside of the detector frame 1208 in which the X-ray detector 1201 and the signal processing substrate 1203 are disposed.

Incidentally, in an example illustrated in FIG. 12, a configuration of ventilation air-cooling type using the fan motor 1213 is illustrated, but for low power consumption, the X-ray imaging apparatus may have a configuration having no fan motor 1213, that is, a configuration in which heat dissipation is achieved by natural air-cooling.

However, the conventional X-ray imaging apparatus has problems described below.

With the development of a recent signal processing technique and a signal transmission technique, an environment for processing the image signal at a high frame rate has been made. The digital X-ray detector has been used in the X-ray imaging apparatus which takes only a still image until now, but an opportunity of using an imaging apparatus which takes a moving image in which an image is continuously taken for a long time or a computed tomography (CT) in which three-dimensional image information is processed is recently gradually increased.

When a moving image is taken at a high rate, a driving frequency of the electrical component per unit time is increased, and power consumption is also inevitably increased. Incidentally, the amount of heat generation is also increased. Heat generation of the X-ray detector does not have a significant impact in low-frequency driving for taking a still image. However, when continuous driving for taking a moving image is performed for long periods of time, the heat generation may greatly affect a characteristic of the X-ray detector itself.

When a high-low distribution of the heat generation amount occurs in a surface of the signal processing substrate 1203 due to heat generation of the electrical components mounted on the signal processing substrate 1203, it affects the X-ray detector 1201 disposed in the same space. Therefore, temperature unevenness between a high temperature part and a low temperature part occurs in a panel surface of the X-ray detector 1201, and a detection characteristic of each part becomes different. Thus, the quality of an output image deteriorates. Furthermore, when the X-ray image apparatus starts its operation, the temperature of the X-ray detector is low directly after power is supplied, whereas the temperature becomes high by influence of heat generation while driving is continuously performed. Therefore, the detection characteristic of the X-ray detector varies according to the lapse of time, causing a stability problem.

SUMMARY OF THE INVENTION

According to an aspect of the present invention, a radiation imaging apparatus includes a radiation detector configured to capture an image of a subject by detecting radiation transmitted through the subject and converting the detected radiation into an image signal; an electrical component configured to process the image signal; an interior housing configured to accommodate the radiation detector and the electrical component therein; an exterior member configured to surround the interior housing; an air circulating unit disposed in the interior housing and configured to circulate air inside the interior housing; and a cooling unit disposed inside of the exterior member and outside of the interior housing and configured to cool the housing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a table illustrating an example of driving states of a plurality of fan motors under respective conditions of a temperature value T1 and a temperature value T2 at the time of continuous imaging operation according to the third exemplary embodiment of the present invention.

DESCRIPTION OF THE EMBODIMENTS

Various exemplary embodiments, features, and aspects of the invention will be described in detail below with reference to the drawings.

Figure 1:
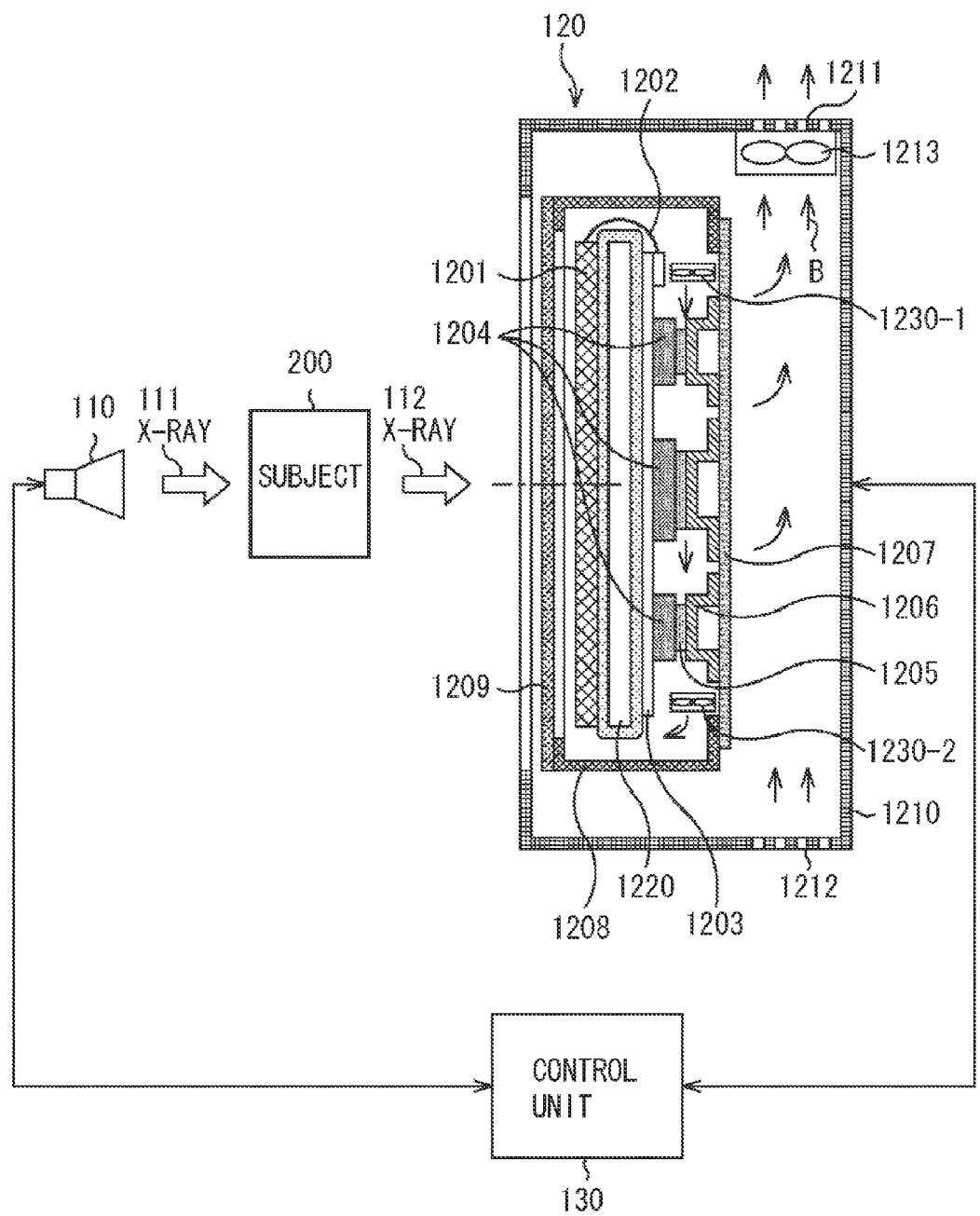
FIG. 1 is a view illustrating an example of a schematic configuration of an X-ray imaging apparatus according to a first exemplary embodiment of the present invention.
Figure 12:
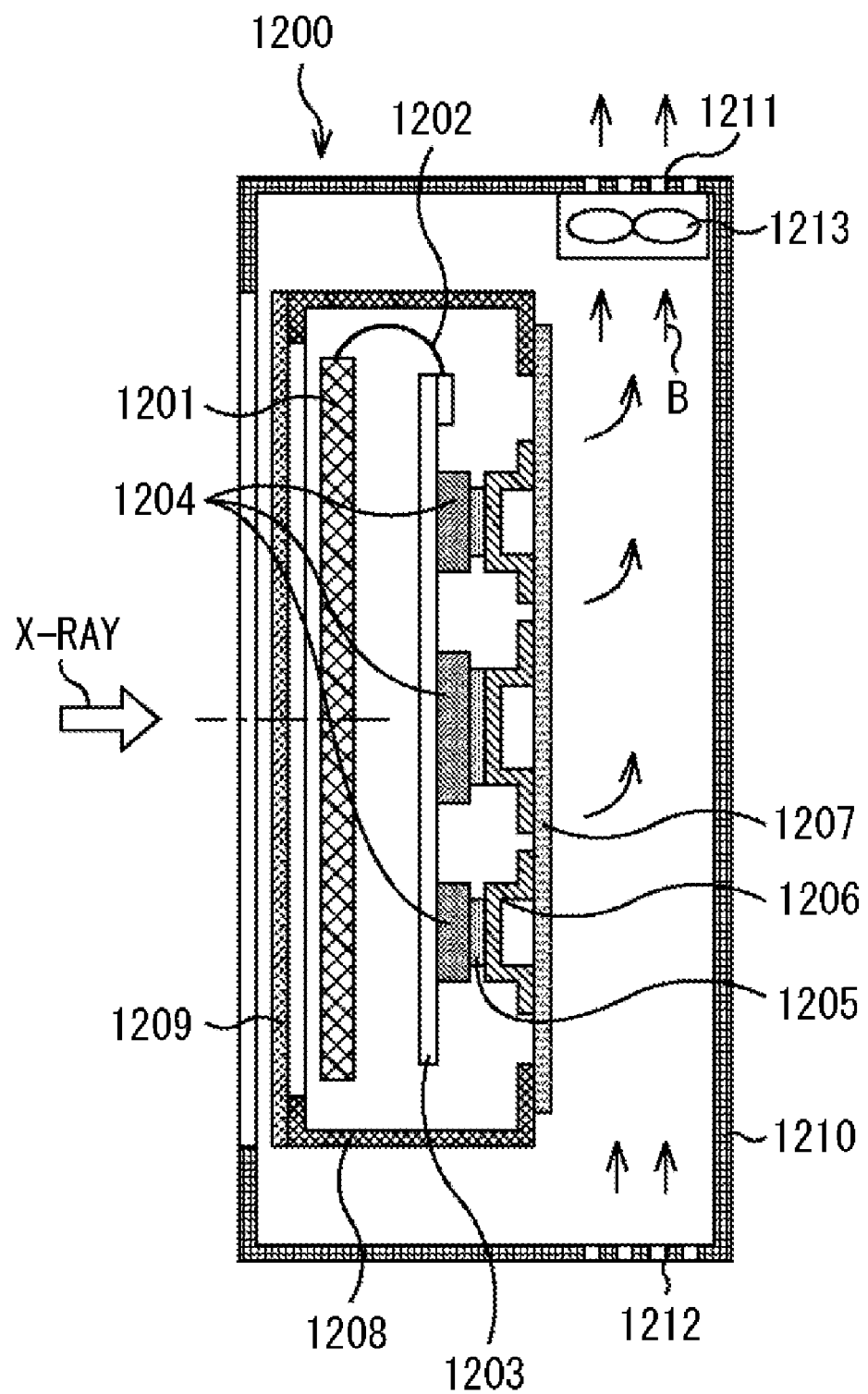
FIG. 12 is a view illustrating an example of a schematic configuration of an imaging unit of a conventional X-ray imaging apparatus.

FIG. 1 is a view illustrating an example of a schematic configuration of an X-ray imaging apparatus (a radiation imaging apparatus) according to a first exemplary embodiment of the present invention. In FIG. 1, features of the first embodiment similar to features of the configuration illustrated in FIG. 12 are denoted by the same reference numbers.

An X-ray imaging apparatus (a radiation imaging apparatus) 100 includes an X-ray generation unit (a radiation generation unit) 110, an imaging unit 120, and a control unit 130 as illustrated in FIG. 1.

The X-ray generation unit 110 generates radiation in the form of an X-ray 111 and irradiates with the X-ray 111 a subject 200 based on control of the control unit 130. Upon interaction with the subject 200, the radiation exits from the subject 200 in the form of an emitted X-ray 112 and is detected by the imaging unit 120 (particularly, an X-ray detector 1201) as an image signal. To that end, the subject 200 is disposed between and the X-ray generation unit 110 and the imaging unit 120 having the X-ray detector 1201 therein. That is, the X-ray generation unit 110 and the imaging unit 120 are disposed to face each other and the subject 200 is disposed therebetween.

The imaging unit 120 includes the X-ray detector 1201, a flexible cable 1202, a signal processing substrate 1203, electrical components 1204, a thermal conduction sheet 1205, a thermal conduction member 1206, a heat dissipation frame 1207, a detector frame 1208, and an X-ray transmitting portion cover 1209. The imaging unit 120 further includes an exterior cover 1210, ventilation holes 1211 and 1212, a fan motor 1213, a thermal insulation member 1220, and fan motors 1230-1 and 1230-2.

The emitted X-ray 112 which has been transmitted through the subject 200 is incident on the X-ray detector (the radiation detector) 1201 in a direction of the arrow so labeled. The X-ray detector 1201 converts the incident X-ray to an electrical signal (an image signal). The image signal is then transmitted to the signal processing substrate 1203 via the flexible cable 1202. Plural electrical components 1204 are mounted on the signal processing substrate 1203. The electrical components 1204 are configured to process the image signal received from the X-ray detector 1201 and may also perform various operations for driving the X-ray detector 1201.

Depending on the amount of processing required for the image signal and the complexity of the detector 1201, a large number of electrical components 1204 may be mounted on the signal processing substrate 1203. Accordingly, the electrical components 1204 serve as the main heat generation sources in the imaging unit 120. As a heat dissipation unit for preventing generated heat from being concentrated, a thermal conduction sheet 1205, a thermal conduction member 1206, and a heat dissipation frame 1207 are disposed in the illustrated configuration so as to form a heat transfer route. Although in the first embodiment each of the elements that form the heat transfer route contribute to form an optimum heat transfer route, in other embodiments not all elements may be required. In some instances, the heat transfer route may be formed by fewer or larger number of elements.

The thermal conduction sheet 1205 is, for example, an elastic body sheet made of silicone rubber that efficiently transmits the heat of the electrical components 1204 to the thermal conduction member 1206. The thermal conduction member 1206 can be made of, for example, a material with high thermal conductivity such as copper or aluminum that efficiently transmits the heat to the heat dissipation frame 1207. Further, when the amount of heat generation is large, a special thermal conduction member such as a heat pipe or a component using a graphite material may be used, as the thermal conduction member 1206. The heat dissipation frame 1207 is a member which spreads the heat transferred from the thermal conduction member 1206 and transmits the spread heat by convective flow of air or heat radiation so as to discharge the heat from the surroundings of the electrical components 1204 towards an outside environment. The thermal conduction member 1206 also forms part of a frame of the housing structure to be discussed more in detail below.

In the present exemplary embodiment, the heat radiation frame 1207 can be made of a high thermal conductivity metal, for example, aluminum that would meet the requirements of strength and thermal diffusivity necessary to support the above-described elements and to dissipate the heat generated thereof. Treatment (alumite treatment or coating) for increasing thermal emissivity of a material surface may be applied to the heat radiation frame 1207 to efficiently perform heat exchange by heat radiation. Also, a technique for partially increasing a surface area (for example, a process of forming plural fins which make a surface rough) may be applied to the heat radiation frame 1207 to efficiently perform heat exchange with air.

A detector frame 1208 includes the X-ray detector 1201 and the signal processing substrate 1203 therein, and holds the X-ray detector 1201 and the signal processing substrate 1203 via members which are not illustrated. The detector frame 1208 is made of metal with electrical conductivity such as iron, stainless steel, aluminum or combinations thereof. The detector frame 1208 also serves to protect the X-ray detector 1201 and the electrical components 1204 which are included therein from external electrical noise and to prevent internal electromagnetic waves from being emitted to the surrounding environment.

An X-ray transmitting portion cover 1209 transmits the X-ray so that the X-ray cannot deteriorate and protects the X-ray detector 1201. As the X-ray transmitting portion cover 1209, a carbon sheet made of a material with high X-ray transmittance or a thin aluminum sheet is used. The heat dissipation frame 1207, the detector frame 1208, and the X-ray transmitting portion cover 1209 are combined to form the housing structure (an interior housing structure). The housing structure almost hermetically seals a space that accommodates therein the X-ray detector 1201, the signal processing substrate 1203, and the electrical components 1204, among others. Therefore, external light does not reach a photosensitive portion of the X-ray detector 1201, and the moisture or dust is prevented from entering into the neighborhood of the X-ray detector 1201 and the signal processing substrate 1203. Further, the housing structure also provides shielding from intrusion of the electrical noise and prevents emission of the electromagnetic waves in an efficient manner.

An exterior cover 1210 is disposed on the outside of the housing structure (i.e., surrounding the interior housing) and is configured to form an exterior member. The exterior member includes the interior housing therein and provides an aesthetic appearance of the imaging unit 120. The exterior cover 1210 is coupled to the detector frame 1208 via a portion which is not illustrated to support the detector frame 1208. The exterior cover 1210 is supported from the outside by a mechanism which is not illustrated. In the exterior cover 1210, ventilation holes 1211 and 1212 are formed. A fan motor 1213 is disposed at a position adjacent to the ventilation hole 1211. The fan motor 1213 performs a blowing operation for discharging air in the imaging unit 120 through the ventilation hole 1211 and constitutes a cooling unit for decreasing the temperature inside the imaging unit 120 (particularly, for decreasing the temperature inside the interior housing). The ventilation hole 1212 serves to take air from outside the imaging unit 120 into the inside.

Heat inside the housing structure (the interior housing) is spread around the heat dissipation frame 1207 and transferred to air contacting a surface outside of the housing structure. The air flows in a B direction indicated by an arrow under a blowing action of the fan motor 1213 so as to be discharged to the outside of the imaging unit 120 through the ventilation hole 1211.

A thermal insulation member 1220 is a member having a thermal insulation effect for preventing heat of the electrical components 1204 mounted on the signal processing substrate 1203 from being transmitted to the X-ray detector 1201. The thermal insulation member 1220 includes a member with low thermal conductivity. For example, the thermal insulating member 1220 includes a porous resin member, a sac-like member which encloses textiles, or a box-like structure which has a hermetically sealed air space. In a hermetically sealed box-like structure, it is possible to make the inside of the hermetically-sealed space of the box-like structure close to a vacuum, and since a heat transfer by the convective flow is suppressed, a thermal insulation effect is further increased by the thermal insulation member 1220. Further, even when it is difficult to perfectly hermetically seal, if an opening is a small space which hardly causes the convective flow, a large thermal effect is obtained by the thermal insulation member 1220.

For example, even when a surface material of the box-like structure includes a metal material with low thermal emissivity such as stainless steel, it is possible to suppress the heat transfer by radiation, and the thermal insulation effect by the thermal insulation member 1220 is increased. As described above, the thermal insulation member 1220 is disposed between the X-ray detector 1201 and the signal processing substrate 1203. Thus, even at the time of continuous imaging operation, it is possible to prevent the temperature from being increased enough to affect a characteristic or durability of the X-ray detector 1201. An influence of a heat generation distribution on the signal processing substrate 1203 to a temperature distribution in a panel surface of the X-ray detector 1201 is reduced, and it is possible to prevent the quality of the output image from deteriorating.

An air circulating unit in the form of a fan motor 1230 (see FIG. 2) is disposed in the detector frame 1208. More specifically, the fan motor 1230 (shown in FIG. 2) is disposed the housing structure (the interior housing) as an air circulating unit which serves to circulate air inside the housing and reduce a temperature variation of the housing inside. In the example illustrated in FIG. 1, as the fan motor 1230, two fan motors 1230-1 and 1230-2 are disposed in the housing structure. In other instances, however, more fan motors can be disposed in the housing structure based on requirements of the specific application. In the present exemplary embodiment, the fan motor 1230 which has a small diameter with a small blowing amount can be used to realize a compact size of the imaging unit 120. Plural fan motors may be installed to circulate air.

As described above, the fan motor 1230 which circulates air inside the housing can be installed as plural fan motors. Therefore, heat dissipation by the convective flow is accelerated to thereby contribute to cooling the electrical component 1204, which generates high heat, whereby an abnormal operation and a deterioration risk can be reduced. An influence of the heat generation distribution on the signal processing substrate 1203 to the temperature distribution in the panel surface of the X-ray detector 1201 is reduced, and it is possible to prevent the quality of the output image from deteriorating.

However, when the X-ray imaging apparatus 100 continuously takes a moving image at a high rate, for example, as in a process known as fluoroscopic imaging, the electrical components 1204 may generate heat in amounts which cannot be dissipated by circulation of air of the housing inside via the fan motor 1230. In this case, a technique of cooling from the heat dissipation frame 1207 side is required.

Here, as a technique of improving heat dissipation which can be performed in the heat dissipation frame 1207, the following techniques described below may be used.

"A technique of using a metal material with high thermal conductivity represented by aluminum", "a technique (e.g., an alumite treatment or coating) of applying a treatment for improving thermal emissivity of a member surface", and "a technique of applying a process (e.g., a process of forming plural fins which make a surface rough) of partially increasing a surface area" may be considered.

Further, a forced air-cooling method by the fan motor 1213 is effective, but a method for taking and cooling heat of the heat dissipation frame 1207 by using a cooling unit such as a heat sink made of copper or aluminum, a Peltier device, and a liquid-cooling unit is also effective. When the cooling unit such as the fan motor for air cooling, the Peltier device, and the liquid-cooling unit is used, the use electric power, cost of fabrication, noise generation, and breakdown occurrence, and other issues may be increased. Therefore, employing a cooling unit using thermal conduction or heat radiation also has a great advantage.

For example, in the case of using thermal conduction, a member with high thermal conductivity is installed as a cooling unit to be coupled to both the heat dissipation frame 1207 and the exterior cover 1210. As the member with high thermal conductivity, there are, for example, a structure made of copper or aluminum, a heat pipe, and a graphite sheet. Since the member accelerates heat exchange between the heat dissipation frame 1207 and the exterior cover 1210, the member is effective as the cooling unit.

In the case of using heat radiation, a process of increasing thermal emissivity of a wall surface of the housing structure including the heat dissipation frame 1207, the detector frame 1208, and the X-ray transmitting portion cover 1209; or of the exterior member including the exterior cover 1210 is performed. Particularly, an alumite treatment to an aluminum material, a coating using a coating material with high thermal emissivity, attachment onto a heat dissipation sheet surface, and using a material coated with a thermal emissive film are effective as the cooling unit.

By configuring the imaging unit 120 as described above, even when taking a moving image in which continuous driving of the X-ray detector 1201 is required for a long time, it is possible to improve an effect of cooling the electrical components 1204, which generates high heat. Further, a characteristic variation caused by temperature unevenness in the panel surface of the X-ray detector 1201 is inhibited, and thus it is possible to maintain stable performance of the X-ray detector 1201.

The control unit 130 controls an overall operation of the X-ray imaging apparatus 100.

The control unit 130 is configured with, for example, a general computer and has a hardware configuration such as a central processing unit (CPU), a random access memory (RAM), a read only memory (ROM), an external memory, an input device, a display unit, and a communication interface. The CPU performs overall control of the X-ray imaging apparatus 100 by using a program or data stored in, for example, the ROM or the external memory. The RAM includes an area in which a program or data loaded from the ROM or the external memory is temporarily stored and a work area necessary for the CPU to perform various pieces of processing. The ROM generally stores, for example, a basic input/output system (BIOS) and setting data of a computer. The external memory stores programs executed by an operating system (OS) or the CPU and information required for processing of the control unit 130. The input device is operated, for example, when an operator gives various instructions to the X-ray imaging apparatus 100 and inputs the instruction to the CPU. The display unit displays, for example, various pieces of information and images based on the control of the CPU. The communication interface serves to transmit and receive various pieces of information and data between the control unit 130 and an external device.

Figure 2:
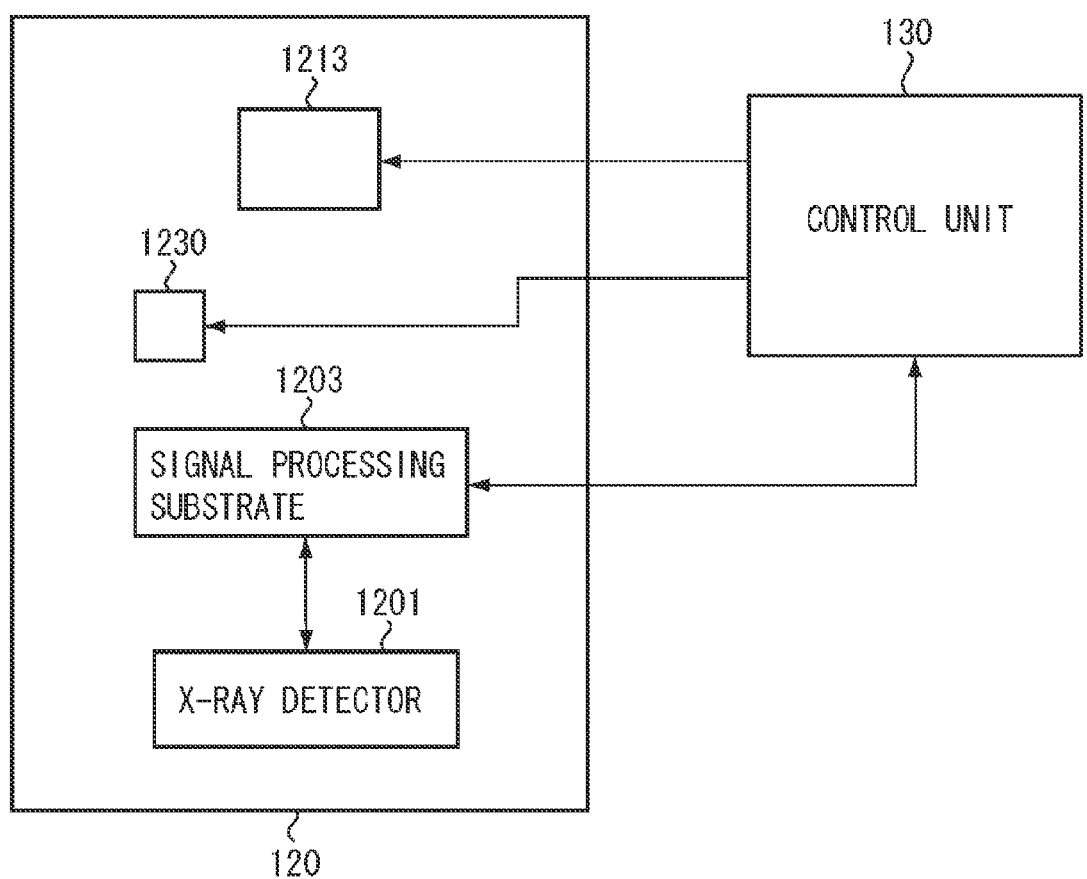
FIG. 2 is a schematic diagram illustrating an example of a control relationship between a control unit and an imaging unit in the X-ray imaging apparatus according to the first exemplary embodiment of the present invention.

FIG. 2 is a schematic diagram illustrating an example of a control relationship between the control unit 130 and the imaging unit 120 in the X-ray imaging apparatus (the radiation imaging apparatus) according to the first exemplary embodiment of the present invention. In FIG. 2, a similar configuration as the configuration illustrated in FIG. 1 is denoted by the same reference numbers.

As illustrated in FIG. 2, the cooling unit in the form of the fan motor 1213 and the circulating unit in the form of the fan motor 1230 are connected to be controlled by the control unit 130. The control unit 130 performs power control for the fan motors 1213 and 1230 to perform switching control between driving and stop thereof. For example, the control unit 130 performs control for stopping either or both of the fan motor 1213 and the fan motor 1230 in a state in which the imaging operation frequency is low, for example, a state in which continuous moving image operation is not performed. Therefore, energy consumption can be reduced in a state in which adverse influence by heat generation is small.

The control unit 130 is configured to control an operation of the signal processing unit 1203 and the X-ray detector 1201 via the signal processing substrate 1203 connected with the X-ray detector 1201. For example, the control unit 130 is configured to acquire an image signal detected by the X-ray detector 1201 via the signal processing substrate 1203 as image data.

Figure 3:
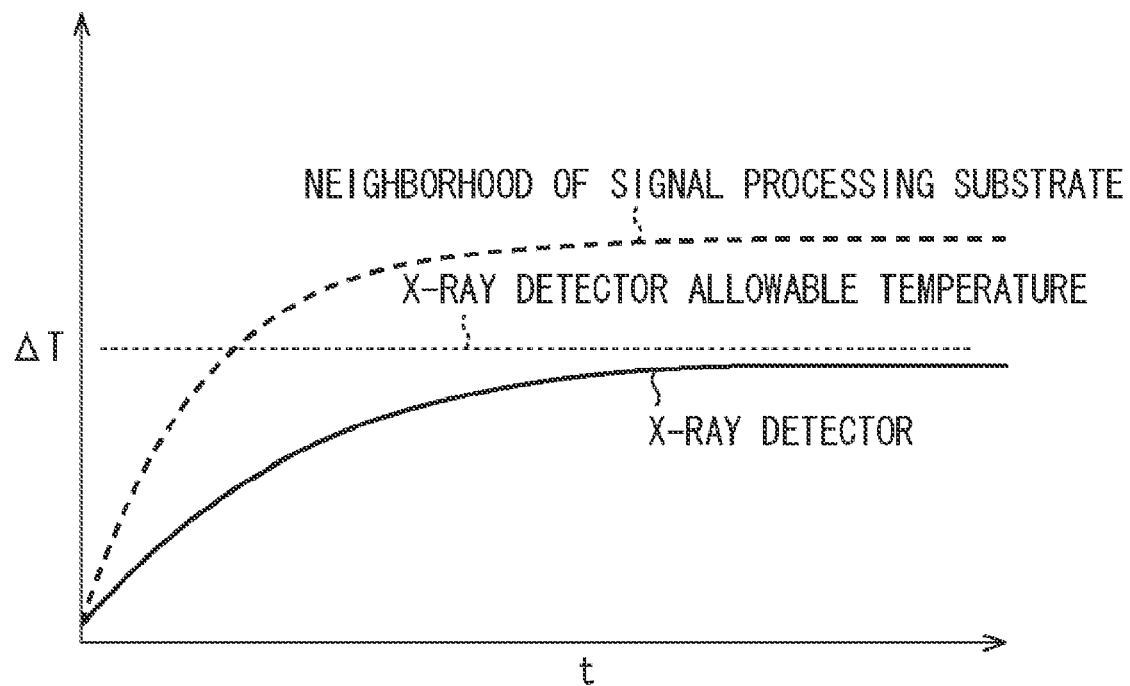
FIG. 3 is a graph illustrating an example of a temperature variation in the imaging unit illustrated in FIGS. 1 and 2.

FIG. 3 is a graph illustrating an example of a temperature variation in the imaging unit 120 illustrated in FIGS. 1 and 2. Particularly, FIG. 3 illustrates a temperature variation of air in two positions around the X-ray detector 1201 and the signal processing substrate 1203 when continuous imaging operation is persistently performed in a state in which the fan motor 1230 is stopped.

In FIG. 3, it is assumed that an ambient temperature is constant. The vertical axis indicates a temperature variation ΔT, and the horizontal axis indicates an elapsed time t. As illustrated in FIG. 3, in the X-ray detector 1201, when temperature of a semiconductor device or a phosphor used in the X-ray detector 1201 becomes high, an output characteristic deteriorates, and durability is also affected. Therefore, an allowable temperature rise value is set. The allowable temperature rise value of the X-ray detector 1201 (indicated by the dashed line in FIG. 3) is lower than that of a general electrical component, and thus it is necessary to consider a temperature rise.

In the case of an example illustrated in FIG. 3, a temperature rise of air around the signal processing substrate 1203 is rapid due to heat generation of the electrical components 1204. However, a temperature rise of the X-ray detector 1201 is slow and takes a time. This is because the heat generation amount of the signal processing substrate 1203 is larger than that of the X-ray detector 1201, the heat transfer route from the electrical components 1204 of the signal processing substrate 1203 to the X-ray detector 1201 is long, and thermal resistance is large. Here, focusing on the temperature variation of the X-ray detector 1201, a temperature difference occurs between when driving is started and after continuous driving is performed for a predetermined time. However, the temperature difference may sufficiently cause a variation that affects the operating characteristics of the X-ray detector 1201. The temperature of air around the signal processing substrate 1203 can be suppressed to a level having no negative effects on the processing substrate 1203, by using any of the above-described heat dissipation techniques for the electrical components 1204 which are heat generation sources.

Figure 4:
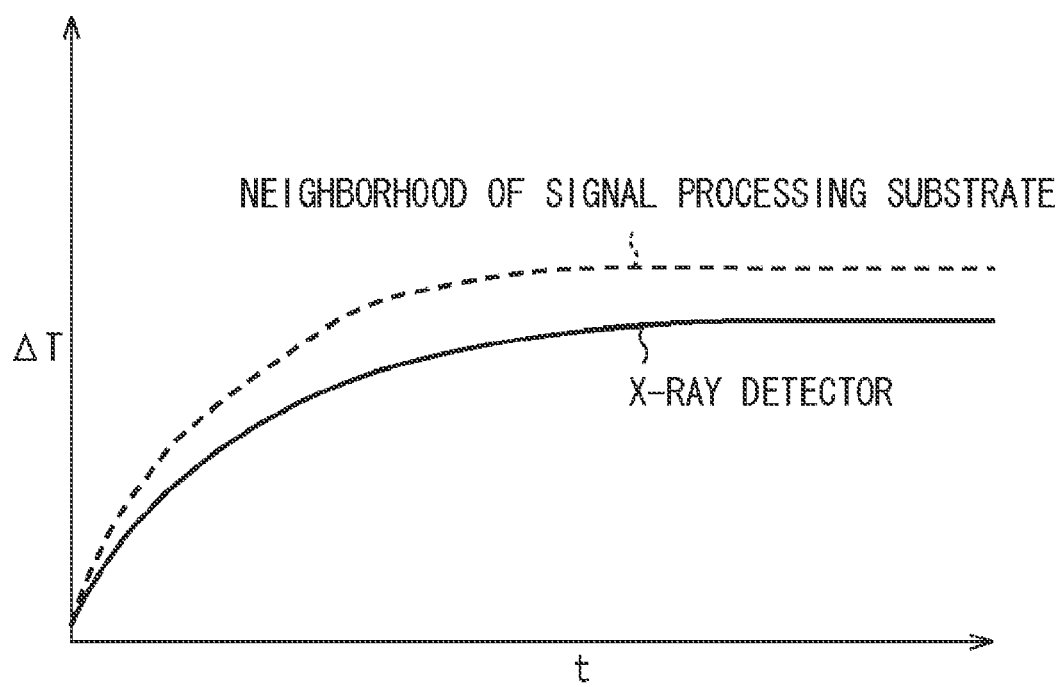
FIG. 4 is a graph illustrating another example of a temperature variation in the imaging unit illustrated in FIGS. 1 and 2.

FIG. 4 is a graph illustrating another example of a temperature variation in the imaging unit 120 illustrated in FIGS. 1 and 2. Particularly, FIG. 4 illustrates a temperature variation of air in two positions around the X-ray detector 1201 and the signal processing substrate 1203 when continuous imaging operation is persistently performed in a state in which the fan motor 1230 is persistently driven under control of the control unit 130. Here, it is assumed that an ambient temperature is constant. The vertical axis indicates a temperature variation ΔT, and the horizontal axis indicates an elapsed time t.

In an example illustrated in FIG. 4, compared to the example illustrated in FIG. 3, heat of air around the signal processing substrate 1203 is spread, a temperature rise thereof is slow, and warm air transmitted by circulation of air by the fan motor 1230 transmits heat. Therefore, the temperature of the X-ray detector 1201 is quickly raised. Further, even after a sufficient time is elapsed, since circulation of air by the fan motor 1230 is being performed, the temperature of the X-ray detector 1201 is raised higher than the case illustrated in FIG. 3, causing an obstacle to satisfy the allowable temperature rise value of the X-ray detector 1201. In this case, heat dissipation has to be accelerated by adding another unit, and thus an increase in cost or another problem may occur.

Figure 5:
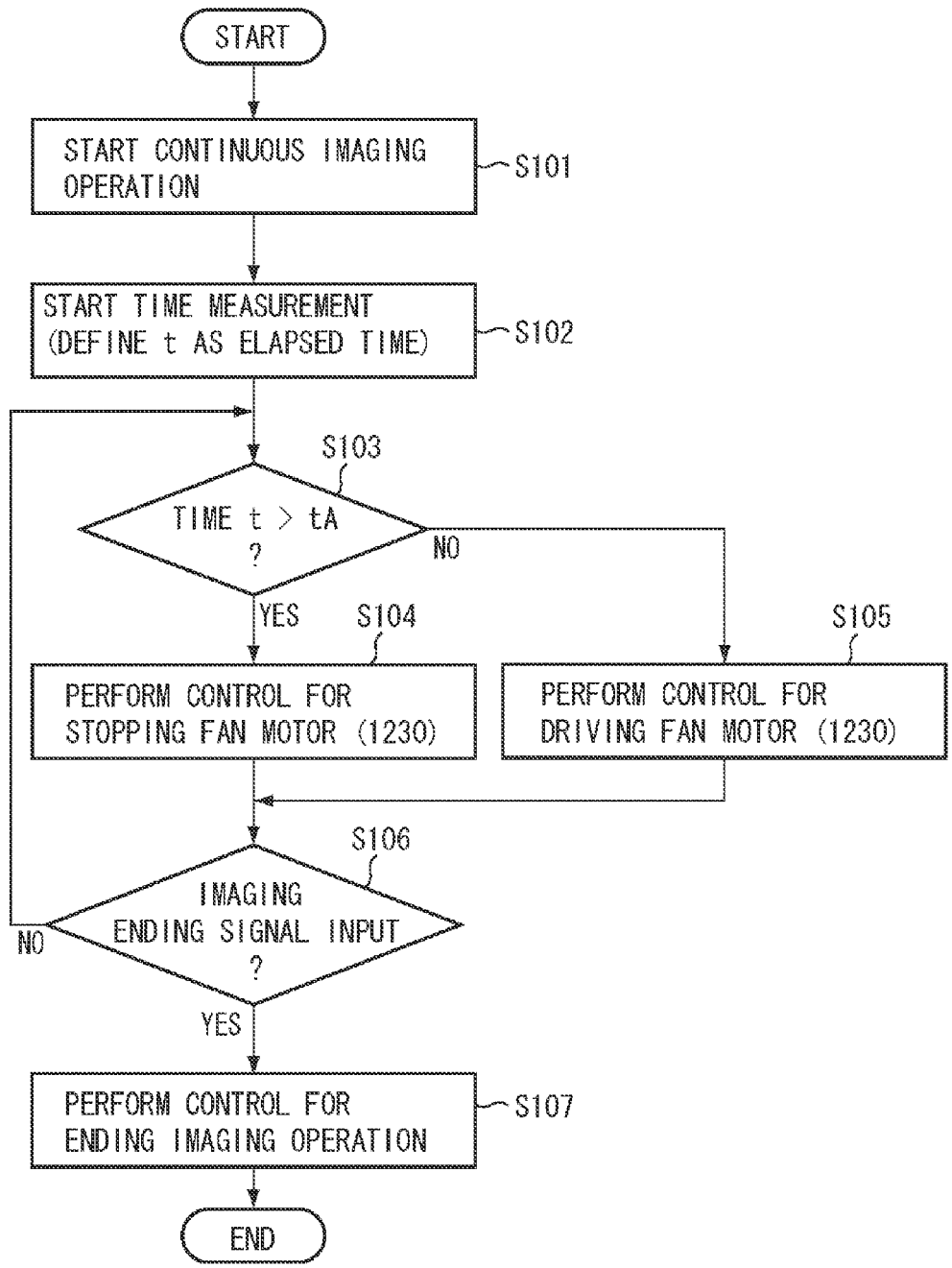
FIG. 5 is a flowchart illustrating an exemplary control method for the X-ray imaging apparatus according to the first exemplary embodiment of the present invention.

For the above reasons, the control unit 130 of the X-ray imaging apparatus 100 according to the present exemplary embodiment is configured to perform control in accordance to a flowchart illustrated in FIG. 5.

FIG. 5 is a flowchart illustrating an example of a processing procedure of a control method for the X-ray imaging apparatus (the radiation imaging apparatus) according to the first exemplary embodiment of the present invention. In processing illustrated in FIG. 5, it is assumed that the air circulating unit represented by the fan motor 1230 is continuously being driven from the beginning of a continuous imaging operation.

First, for example, in step S101, when a continuous imaging operation start instruction is input from the input device by an operator, the control unit 130 controls the X-ray generation unit 110 and the imaging unit 120 to perform start processing of continuous imaging operation.

When continuous imaging operation is started, the control unit 130 also starts time measurement via a built-in timer, at step S102. The control unit 130 also defines t as an elapsed time from the start of continuous imaging operation and performs processing of updating the elapsed time t from time to time.

Subsequently, in step S103, the control unit 130 determines whether the current elapsed time t exceeds a predetermined time tA which is previously set. Here, the predetermined time tA which is previously set is a value which is determined by a configuration or a use environment of the X-ray imaging apparatus. For example, the predetermined time tA may be established by considering the temperature rise inside the imaging unit 120 (particularly, the allow temperature rise of the X-ray detector 1201). In the present exemplary embodiment, a table according to an environment may be provided, or the predetermined time tA is computed in advance from a result of an experiment or a simulation. The control unit 130 stores the predetermined time tA in the external memory in advance.

If it is determined in step S103 that the current elapsed time t exceeds the predetermined time tA which is previously set (YES at S103), processing proceeds to step S104.

In step S104, the control unit 130 performs control for stopping the fan motor 1230. The stopping of the fan motor 1230 stops the circulation of air inside the housing structure (the interior housing) that accommodates the X-ray detector 1201 and the electrical components 1204 therein.

However, if it is determined in step S103 that the current elapsed time t does not exceed the predetermined time tA which is previously set (NO at step S103), processing proceeds to step S105.

In step S105, the control unit 130 performs control for continuously driving the fan motor 1230.

When processing of step S104 or S105 is finished, processing proceeds to step S106. In step S106, the control unit 130 determines whether an imaging operation ending signal is input from the input device, for example, by the operator.

When it is determined in step S106 that the imaging operation ending signal is not input (No at step S106), processing returns to step S103, and then processing subsequent to step S103 is performed again.

When it is determined in step S106 that the imaging operation ending signal is input (YES at step S106), processing proceeds to step S107.

In step S107, the control unit 130 controls the X-ray generation unit 110 and the imaging unit 120 to perform processing of ending imaging operation. Thereafter, processing of the flowchart illustrated in FIG. 5 is finished.

Figure 6:
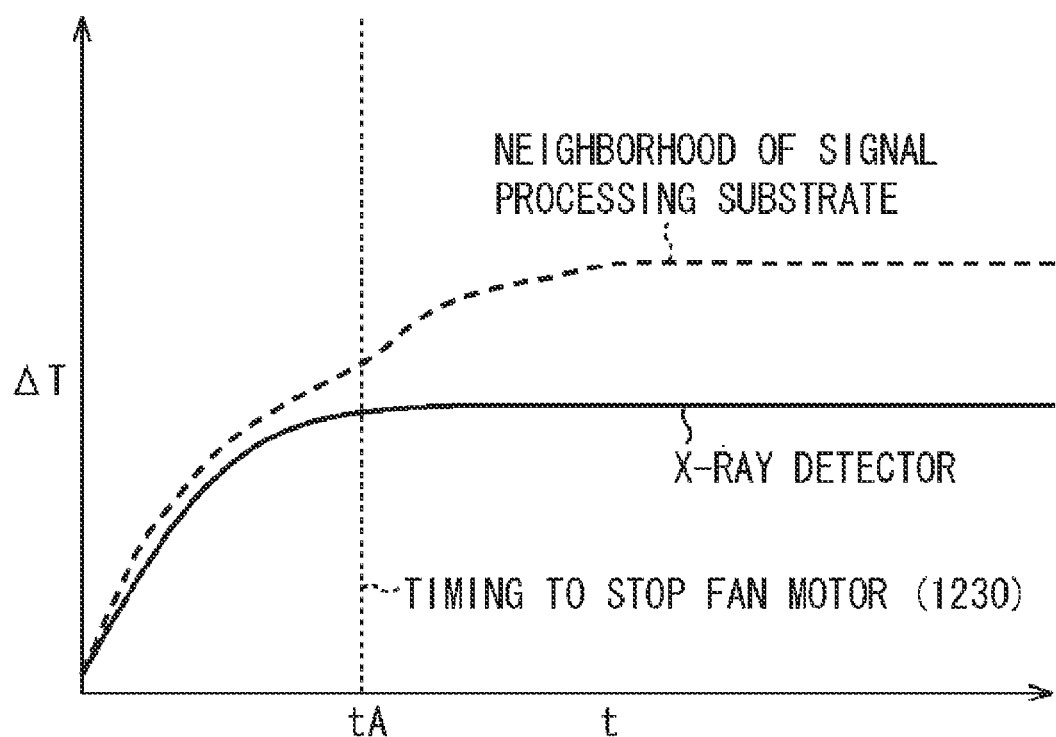
FIG. 6 is a graph illustrating an example of a temperature variation inside the imaging unit of the X-ray imaging apparatus according to the first exemplary embodiment of the present invention.

In the present exemplary embodiment, the above control is performed by the control unit 130, and thus, for example, a temperature graph as illustrated in FIG. 6 is obtained.

FIG. 6 illustrates an example of a temperature variation inside the imaging unit 120 of the X-ray imaging apparatus (the radiation imaging apparatus) according to the first exemplary embodiment of the present invention. Particularly, FIG. 6 illustrates a temperature variation of air in two positions around the X-ray detector 1201 and the signal processing substrate 1203 when an operation of the fan motor 1230 is controlled by control of the control unit 130 illustrated in FIG. 5 and continuous imaging operation is persistently performed. In FIG. 6, it is assumed that an ambient temperature is constant. The vertical axis indicates a temperature variation ΔT, and the horizontal axis indicates an elapsed time t, and tA represents a predetermined time at which the fan motor 1230 should be stopped.

In FIG. 6, the fan motor 1230 is stopped at timing of the predetermined time tA illustrated by a vertical dotted line. In a period before the predetermined time tA which is larger than the elapsed time t, since the fan motor 1230 is in a driving state, the inside of the imaging unit 120 shows the same temperature variation as in the characteristic diagram illustrated in FIG. 4. At this time, heat of air around the signal processing substrate 1203 is spread, so that the temperature rise thereof becomes slow, and the temperature of the X-ray detector 1201 is quickly raised.

Then, when the elapsed time t is larger than the predetermined time tA, the fan motor 1230 is stopped. Therefore, the temperature rise of the X-ray detector 1201 is stopped due to spreading of heat of air around the signal processing substrate 1203 and warm air and is converged to the same temperature value as in the characteristic diagram illustrated in FIG. 3.

Comparing the characteristic diagram illustrated in FIG. 6 with the characteristic diagrams of FIGS. 3 and 4, for the temperature variation of FIG. 6 in which control according to the present exemplary embodiment is employed, due to the inside circulation operation of the fan motor 1230, the temperature of the X-ray detector 1201 is raised since imaging operation starts. When continuous imaging operation is continuously performed, after the temperature of the X-ray detector 1201 is sufficiently high, warm air heated by the signal processing substrate 1203 as the fan motor 1230 is stopped is not transmitted, so that the temperature rise of the X-ray detector 1201 is suppressed. The temperature of the X-ray detector 1201 is thermally saturated in a stage in which the temperature is not as high as that in the state illustrated in FIG. 4. Due to the control according to the present exemplary embodiment, it is possible to reduce a time until the temperature of the X-ray detector 1201 becomes close to a constant value after imaging operation starts and suppress an influence of the characteristic variation of the X-ray detector 1201 by the temperature variation. Further, it is possible to prevent the temperature of the X-ray detector 1201 from being excessively raised to be equal to or more than the allowable temperature rise value.

Further, it is effective in obtaining the same effect to stop the fan motor 1213 at a time before stop timing of the fan motor 1230 illustrated in FIG. 6 and perform control for starting driving at almost the same timing as the stop of the fan motor 1230. As the fan motor 1213 does not operate, cooling of the electrical components 1204 is not accelerated, so that a temperature rise degree around the signal processing substrate 1203 becomes further abrupt. Further, heat is transmitted to the X-ray detector 1201 side by an inside circulation action of the fan motor 1230, and a time until the temperature of the X-ray detector 1201 becomes close to a constant value is further shortened. Therefore, it is possible to further improve suppression of influence of the characteristic variation of the X-ray detector 1201 by the temperature variation. Even when a unit other than the fan motor 1213 is used as the cooling unit, if it is possible to perform control for increasing and decreasing an action of the cooling unit similarly to control for driving/stopping the fan motor 1213, it is effective in shortening a time until the temperature of the X-ray detector 1201 becomes close to a constant value.

According to the X-ray imaging apparatus of the present exemplary embodiment, even when taking a moving image in which continuous driving is performed for a long time, it is possible to improve an effect of cooling the electrical components 1204 which generate high heat. Further, it is possible to inhibit the characteristic variation of the X-ray detector 1201 by the temperature variation on the time axis, and it is possible to maintain stable performance of the X-ray detector 1201.

Next, a second exemplary embodiment of the present invention will be described. The second exemplary embodiment employs almost the same configuration as the X-ray imaging apparatus 100 illustrated in FIG. 1 but is slightly different in the inside configuration of the imaging unit from the first exemplary embodiment. Hereinafter, the second exemplary embodiment will be described focusing on parts different from the first exemplary embodiment.

Figure 7:
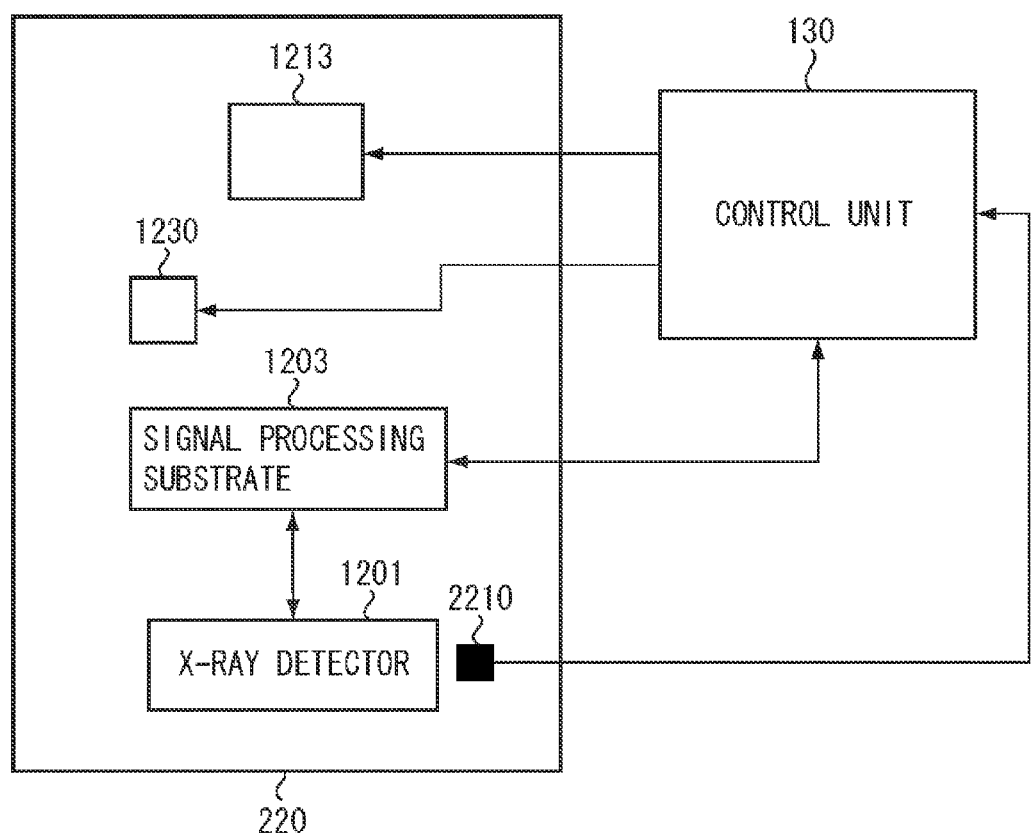
FIG. 7 is a schematic diagram illustrating an example of a control relationship between a control unit and an imaging unit in an X-ray imaging apparatus according to a second exemplary embodiment of the present invention.

FIG. 7 is a schematic diagram illustrating an example of a control relationship between the control unit 130 and an imaging unit 220 in an X-ray imaging apparatus (a radiation imaging apparatus) according to the second exemplary embodiment of the present invention. In FIG. 7, a similar configuration as the configuration illustrated in FIG. 2 (or FIG. 1) is denoted by the same reference numbers.

As a different part from the configuration illustrated in FIG. 2, the imaging unit 220 of the second exemplary embodiment is different from the imaging unit 120 illustrated in FIG. 2 in that a first temperature detection element 2210 is additionally disposed around the X-ray detector 1201. Temperature information detected by the first temperature detection element 2210 is transmitted to the control unit 130 as an electrical signal, and the control unit 130 is configured to recognize a temperature value around the X-ray detector 1201.

Figure 8:
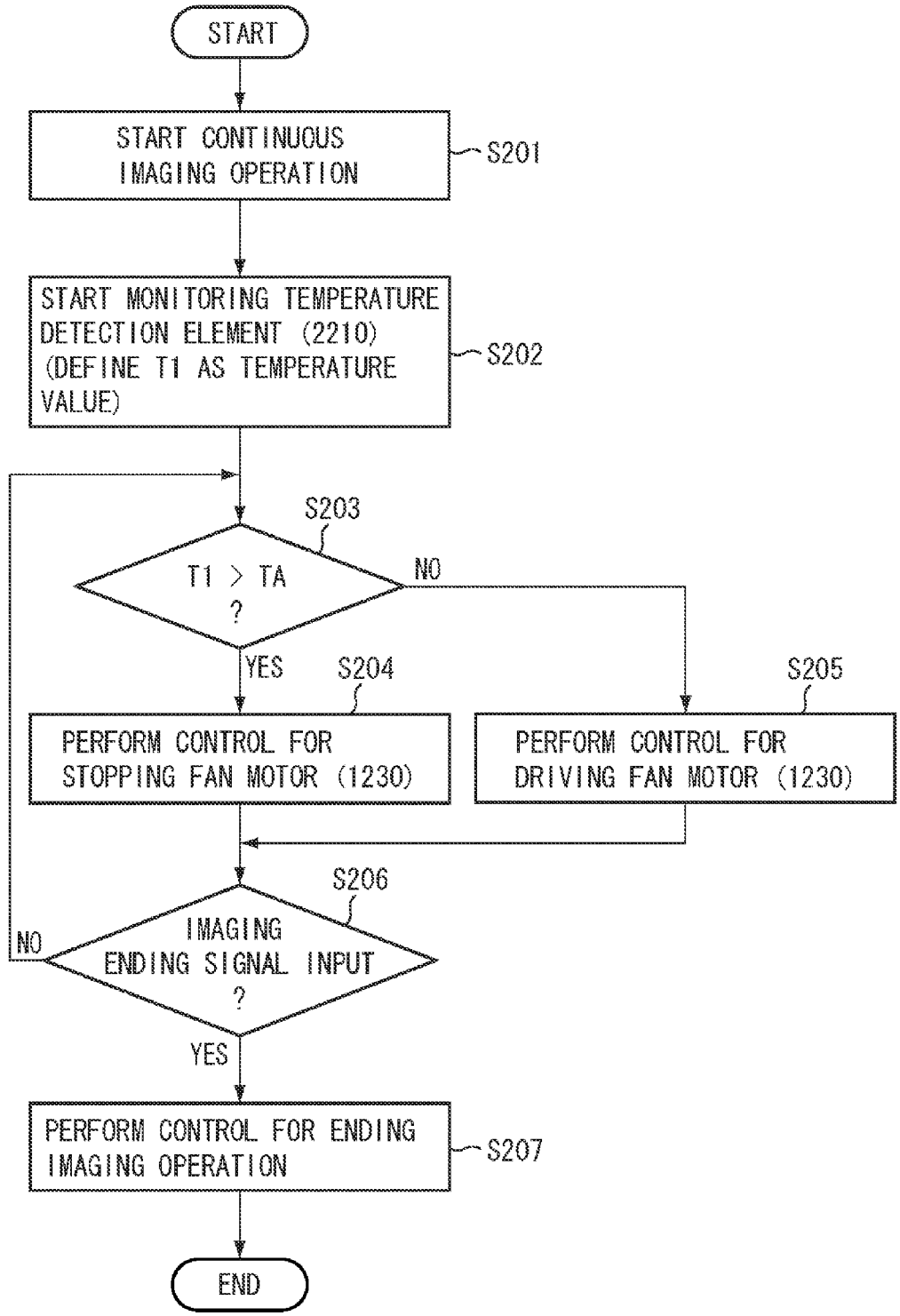
FIG. 8 is a flowchart illustrating an exemplary control method for the X-ray imaging apparatus according to the second exemplary embodiment of the present invention.

The control unit 130 of the X-ray imaging apparatus according to the second exemplary embodiment is configured to perform control in accordance with a flowchart illustrated in FIG. 8.

FIG. 8 is a flowchart illustrating an example of a processing procedure of a control method for the X-ray imaging apparatus (the radiation imaging apparatus) according to the second exemplary embodiment of the present invention. In processing illustrated in FIG. 8, it is assumed that the fan motor 1230 is continuously being driven from the beginning stage.

First, for example, in step S201, when a continuous imaging operation start instruction is input from the input device by an operator, the control unit 130 controls the X-ray generation unit 110 and the imaging unit 220 to perform start processing of continuous imaging operation.

When continuous imaging operation is started, the control unit 130 starts monitoring a temperature via the first temperature detection element 2210, at step S202. The control unit 130 also defines T1 as a temperature value by the first temperature detection element 2210 and performs processing of updating the temperature value T1 from time to time.

Subsequently, in step S203, the control unit 130 determines whether the current temperature value T1 of the first temperature detection element 2210 exceeds a predetermined temperature value TA which is previously set. Here, the predetermined temperature value TA which is previously set is a value which is determined, for example, by considering the temperature rise inside the imaging unit 220 (particularly, the allow temperature rise of the X-ray detector 1201). In the present exemplary embodiment, the predetermined temperature value TA is set to include a margin for the allowable temperature rise of the X-ray detector 1201 and is stored in the external memory of the control unit 130.

When it is determined in step S203 that the current temperature value T1 of the first temperature detection element 2210 exceeds the predetermined temperature TA which is previously set (YES at step S203), processing proceeds to step S204.

In step S204, the control unit 130 performs control for stopping the fan motor 1230.

When it is determined in step S203 that the current temperature value T1 of the first temperature detection element 2210 does not exceed the predetermined temperature TA which is previously set (NO at step S204), processing proceeds to step S205.

In step S205, the control unit 130 performs control for continuously driving the fan motor 1230.

When processing of step S204 or S205 is finished, processing proceeds to step S206. In step S206, the control unit 130 determines whether an imaging operation ending signal is input from the input device, for example, by the operator.

When it is determined in step S206 that the imaging operation ending signal is not input (NO at step S206), processing returns to step S203, and then processing subsequent to step S203 is performed again.

When it is determined in step S206 that the imaging operation ending signal is input (YES at step S206), processing proceeds to step S207.

In step S207, the control unit 130 controls the X-ray generation unit 110 and the imaging unit 220 to perform processing of ending imaging operation. Thereafter, processing of the flowchart illustrated in FIG. 8 is finished.

In the second exemplary embodiment, the above control is performed by the control unit 130, and thus, for example, a temperature characteristic illustrated in FIG. 6 is obtained similarly to the first exemplary embodiment. That is, it is possible to reduce a time until the temperature of the X-ray detector 1201 becomes close to a constant value after imaging operation starts and suppress influence of the characteristic variation of the X-ray detector 1201 by the temperature variation. Further, it is possible to prevent the temperature of the X-ray detector 1201 from being excessively raised to be equal to or more than the allowable temperature rise value.

Further, as described in the first exemplary embodiment, it is effective in obtaining the same effect to stop the fan motor 1213 at a time before timing of stopping the fan motor 1230 in FIG. 6 and perform control for starting driving at almost the same timing as the stop of the fan motor 1230. Further, as described in the first exemplary embodiment, even when a unit other than the fan motor 1213 is used as the cooling unit, the present exemplary embodiment can obtain the same effect.

In the first exemplary embodiment, the predetermined time tA which is previously set needs to be determined by a configuration or a use environment of the X-ray imaging apparatus. The predetermined time tA may be stored in a table according to a known environment or can be obtained as a result of an experiment or a simulation. However, in the second exemplary embodiment, since the predetermined temperature value TA is set from the allowable temperature of the X-ray detector 1201, a table according to an environment or a result of an experiment or a simulation is not necessary, and thus it is possible to prevent an error of the stop timing of the fan motor 1230.

According to the X-ray imaging apparatus of the second exemplary embodiment, even when taking a moving image in which continuous driving is performed for along time, it is possible to improve an effect of cooling the electrical components 1204 which generate high heat. Further, it is possible to inhibit the variation of the operating characteristics of the X-ray detector 1201 by maintaining the temperature variation within an acceptable range. Thus, it is possible to maintain stable performance of the X-ray detector 1201.

Next, a third exemplary embodiment of the present invention will be described. The third exemplary embodiment employs almost the same configuration as the X-ray imaging apparatus 100 illustrated in FIG. 1 but is slightly different in the inside configuration of the imaging unit from the first exemplary embodiment (or the second exemplary embodiment). Hereinafter, the third exemplary embodiment will be described focusing on parts different from the first exemplary embodiment (or the second exemplary embodiment).

Figure 9:
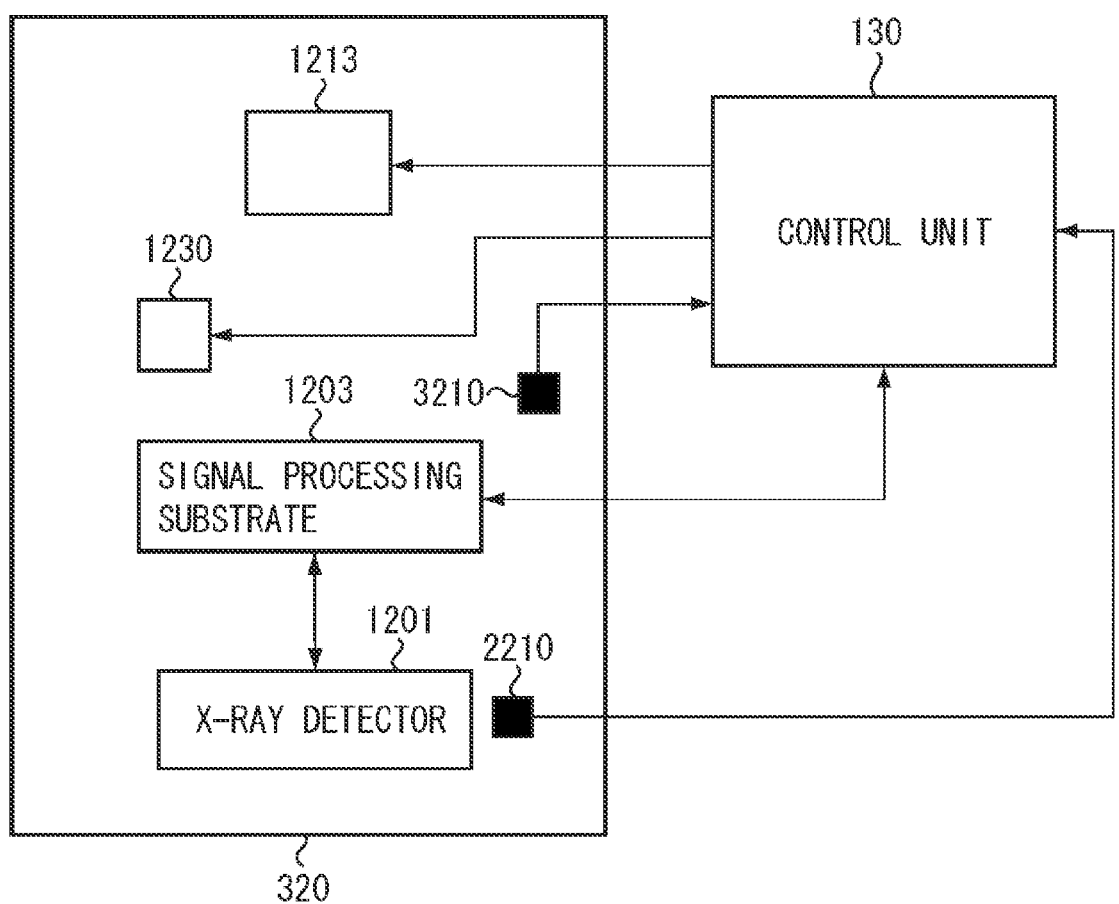
FIG. 9 is a schematic diagram illustrating an example of a control relationship between a control unit and an imaging unit in an X-ray imaging apparatus according to a third exemplary embodiment of the present invention.

FIG. 9 is a schematic diagram illustrating an example of a control relationship between the control unit 130 and an imaging unit 320 in an X-ray imaging apparatus (a radiation imaging apparatus) according to the third exemplary embodiment of the present invention. In FIG. 9, a similar configuration as the configuration illustrated in FIG. 2 (or FIG. 7) is denoted by the same reference numbers.

In the imaging unit 320 of the third exemplary embodiment, compared to the imaging unit 120 illustrated in FIG. 2, similarly to the second exemplary embodiment, the first temperature detection element 2210 is disposed around the X-ray detector 1201. In the imaging unit 320 of the third exemplary embodiment, a second temperature detection element 3210 is additionally disposed around the signal processing substrate 1203 (that is, around the electrical components 1204). Temperature information detected by the first temperature detection element 2210 and the second temperature detection element 3210 is transmitted to the control unit 130 as an electrical signal, and the control unit 130 is configured to recognize a temperature value around the X-ray detector 1201 and around the signal processing substrate 1203.

Figure 10:
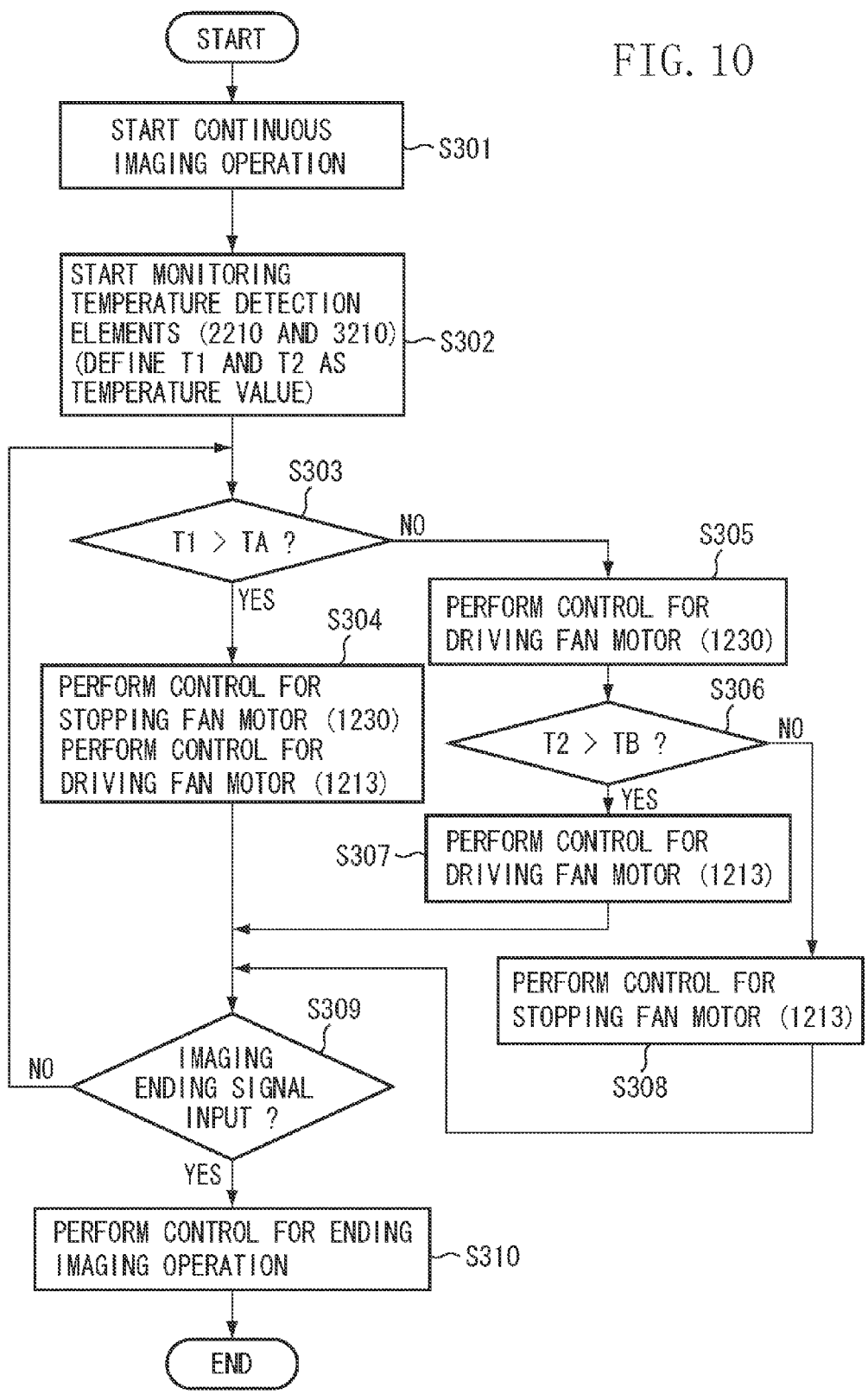
FIG. 10 is a flowchart illustrating an example of a control method for the X-ray imaging apparatus according to the third exemplary embodiment of the present invention.

The control unit 130 of the X-ray imaging apparatus according to the present exemplary embodiment is configured to perform control in accordance with a flowchart illustrated in FIG. 10.

FIG. 10 is a flowchart illustrating an example of a processing procedure of a method for controlling the X-ray imaging apparatus (the radiation imaging apparatus) according to the third exemplary embodiment of the present invention.

First, for example, in step S301, when a continuous imaging operation start instruction is input from the input device by an operator, the control unit 130 controls the X-ray generation unit 110 and the imaging unit 320 to perform start processing of continuous imaging operation.

When continuous imaging operation is started, the control unit 130 also starts monitoring temperature via the first temperature detection element 2210 and the second temperature detection element 3210, at step S302. The control unit 130 defines T1 and T2 as a temperature value by the first temperature detection element 2210 and a temperature value by the second temperature detection element 3210, respectively, and performs processing of updating the temperature values T1 and T2 from time to time.

Subsequently, in step S303, the control unit 130 determines whether the current temperature value T1 of the first temperature detection element 2210 exceeds a predetermined temperature value TA (a predetermined first temperature) which is previously set.

When it is determined in step S303 that the current temperature value T1 of the first temperature detection element 2210 exceeds the predetermined temperature TA which is previously set (YES at step S303), processing proceeds to step S304.

In step S304, the control unit 130 performs control for stopping the fan motor 1230 and for driving the fan motor 1213.

When it is determined in step S303 that the current temperature value T1 of the first temperature detection element 2210 does not exceed the predetermined temperature TA which is previously set (NO at step S303), processing proceeds to step S305.

In step S305, the control unit 130 performs control for driving the fan motor 1230.

Subsequently, in step S306, the control unit 130 determines whether the current temperature value T2 of the second temperature detection element 3210 exceeds a predetermined temperature value TB (a predetermined second temperature) which is previously set.

When it is determined in step S306 that the current temperature value T2 of the second temperature detection element 3210 exceeds the predetermined temperature TB which is previously set (YES at step S306), processing proceeds to step S307.

In step S307, the control unit 130 performs control for driving the fan motor 1213.

When it is determined in step S306 that the current temperature value T2 of the second temperature detection element 3210 does not exceed the predetermined temperature TB which is previously set (NO at step S306), processing proceeds to step S308.

In step S308, the control unit 130 performs control for stopping the fan motor 1213.

When processing of step S304, S307 or S308 is finished, processing proceeds to step S309.

In step S309, the control unit 130 determines whether an imaging operation ending signal is input from the input device, for example, by the operator.

When it is determined in step S309 that the imaging operation ending signal is not input (NO at step S309), processing returns to step S303, and then processing subsequent to step S303 is performed again.

When it is determined in step S309 that the imaging operation ending signal is input (YES at step S309), processing proceeds to step S310.

In step S310, the control unit 130 controls the X-ray generation unit 110 and the imaging unit 320 to perform processing of ending imaging operation. Thereafter, processing of the flowchart illustrated in FIG. 10 is finished.

The predetermined temperature values TA and TB which are previously set are values determined from the allowable temperature values of the X-ray detector 1201 and the electrical components 1204. The values are set to include a margin for the allowable temperature (the allowable temperature rise) and are stored in the external memory of the control unit 130. The allowable temperature (the allowable temperature rise value) of the X-ray detector 1201 whose characteristic variation greatly affects the performance is generally set lower than the allowable temperature of the typical electrical component 1204. The signal processing substrate 1203 on which the plural electrical components 1204 perform signal processing at a high speed are mounted is larger in the amount of heat generation than the X-ray detector 1201, and the temperature value T2 becomes easily higher than the temperature value T1. Therefore, the predetermined temperature value TB is mostly set higher than the predetermined temperature value TA.

FIG. 11 is a table illustrating an example of a driving state of the fan motor 1213 and the fan motor 1230 under respective conditions of the temperature value T1 and the temperature value T2 at the time of continuous imaging operation according to the third exemplary embodiment of the present invention. In FIG. 11, ON represents a driving state of the fan motor, and OFF represents a stop state of the fan motor.

When T1>TA is satisfied, the control unit 130 performs control for turning the fan motor 1213 ON and the fan motor 1230 OFF regardless of a value of T2. In this case, to prevent heat generated by the signal processing substrate 1203 from flowing toward the X-ray detector 1201 as much as possible, driving of the fan motor 1230 is stopped to suppress circulation of air. The fan motor 1213 is driven to accelerate heat dissipation of the signal processing substrate 1203. As this state is formed, the temperature rise of the X-ray detector 1201 is further suppressed.

When T1>TA is not satisfied and T2>TB is satisfied, the control unit 130 performs control for turning the fan motor 1213 ON and the fan motor 1230 ON. In this case, to prevent the electrical components 1204 from being continuously in a high temperature state, the fan motor 1213 is driven to accelerate heat dissipation of the signal processing substrate 1203. At the same time, to raise the temperature of the X-ray detector 1201 and make close to a stable state, the fan motor 1230 is driven to circulate air, and part of heat of the signal processing substrate 1203 is distributed to the X-ray detector 1201.

When T1>TA is not satisfied and T2>TB is not satisfied, the control unit 130 performs control for turning the fan motor 1213 OFF and the fan motor 1230 ON. This state corresponds to a state directly after electrical power is supplied to the X-ray detector or an initial state of continuous imaging operation. In this case, to raise the temperature of the X-ray detector 1201 and make close to a stable state, the fan motor 1230 is driven to circulate air, and part of heat of the signal processing substrate 1203 is distributed to the X-ray detector 1201. At this time, the temperature around the signal processing substrate 1203 is low, and heat to be distributed to the X-ray detector 1201 is scant. Therefore, to prevent heat dissipation of the signal processing substrate 1203, the fan motor 1213 is stopped. Accordingly, the stable state can be realized by raising the temperature of the X-ray detector 1201 more quickly.

Further, as described in the first exemplary embodiment, even when a unit other than the fan motor 1213 is used as a cooling unit, if it is possible to perform control for increasing and decreasing the operation of the cooling unit, it is possible to obtain the same effect in the present exemplary embodiment. Further, in the flowchart illustrated in FIG. 10, if control for realizing the driving state illustrated in FIG. 11 is performed, even if control other than the flowchart illustrated in FIG. 10 is performed, it is possible to obtain the same effect in the present exemplary embodiment.

According to the X-ray imaging apparatus of the present exemplary embodiment, even when taking a moving image in which continuous driving is performed for a long time, it is possible to improve an effect of cooling the electrical components 1204 which generate high heat. Further, it is possible to inhibit the characteristic variation of the X-ray detector 1201 by the temperature variation on the time axis, and it is possible to maintain stable performance of the X-ray detector 1201. As described above, according to the present exemplary embodiment, even when taking a moving image in which continuous driving is performed for a long time, it is possible to improve an effect of cooling the electrical components which generate high heat and realize the stable performance maintenance of the X-ray detector 1201.

The functions of the control unit 130 of the X-ray imaging apparatus according to each exemplary embodiment of the present invention described above and each step of FIGS. 5, 8, and 10 which represent a control method thereof are implemented by executing a program stored in the external memory via the CPU of the computer. The program and a computer readable recording medium such as the external memory which can store the program are included in the present invention.

The present invention may include exemplary embodiments as, for example, a system, an apparatus, a method, a program, or a storage medium. Particularly, the present invention may be applied to a system which includes plural devices or an apparatus including one device.

Incidentally, the present invention includes the case of supplying a software program (a program corresponding to the flowcharts illustrated in FIGS. 5, 8, and 10) for implementing the function of each exemplary embodiment described above to a system or an apparatus directly or remotely. The case achieved such that a computer of the system or the apparatus reads and executes the supplied program code is also included in the present invention.

Therefore, to implement functional processing of the present invention via a computer, program code itself installed in the computer is to implement the present invention. That is, the present invention includes a computer program for implementing functional processing of the present invention.

In this case, if it has a program function, a form such as an object code, a program executed by an interpreter, and script data supplied to an operating system (OS) may be used.

As a storage medium for supplying a program, there are, for example, a floppy disk, a hard disk, an optical disc, a magneto-optical disc, an MO, a CD-ROM, a CD-R, and a CD-RW. There are also a magnetic tape, a non-volatile memory card, a ROM, and a DVD (DVD-ROM and DVD-R).

As an alternative method for supplying a program, an Internet homepage (website) may be accessed by using a browser of a client computer. The program may be supplied by downloading a computer program itself of the present invention or a file including a compressed automatic installation function to a storage medium such as a hard disk.

Program code which configures a program of the present invention may be divided into plural files, and the respective files may be downloaded from different homepages. That is, a WWW server which allows program files for implementing functional processing of the present invention via a computer to be downloaded to plural users is included in the present invention.

A program of the present invention may be encrypted, stored in a storage medium such as a CD-ROM, and distributed to a user. Decryption key information may be downloaded to a user which meets a predetermined condition from a homepage via the Internet. The encrypted program may be executed by using the downloaded key information and installed in the computer.

The function of each exemplary embodiment described above may be implemented by executing a read program via a computer. Part or all of actual processing may be performed via an OS operating on a computer based on an instruction of the program, and the function of each exemplary embodiment described above may be implemented by the processing.

A program read from a storage medium may be written in a memory disposed in a function extension board inserted in a computer or a function extension unit connected to a computer. Thereafter, part of all of actual processing may be performed by a CPU disposed in the function extension board or the function extension unit based on an instruction of the program, and the function of each exemplary embodiment described above may be implemented by the processing.

While the present invention has been described with reference to exemplary embodiments, it is to be understood that the invention is not limited to the disclosed exemplary embodiments. Specifically, in the context of the above specification, embodiments in which an X-ray is applied as the radiation are described, but the present invention is not limited thereto. For example, as the radiation, an alpha (α) ray, a beta (β) ray, and a gamma (γ) ray may be included. Accordingly, the scope of the following claims is to be accorded the broadest interpretation so as to encompass all modifications, equivalent structures, and functions.

This application claims priority from Japanese Patent Application No. 2009-086754 filed Mar. 31, 2009, which is hereby incorporated by reference herein in its entirety.

What is claimed is:

1. A radiation imaging apparatus comprising:
a radiation detector configured to capture an image of a subject by detecting radiation transmitted through the subject and converting the detected radiation into an image signal;
an electrical component configured to process the image signal;
an interior housing configured to accommodate the radiation detector and the electrical component therein;
a blowing unit disposed in the interior housing and configured to blow air around the electrical component and to direct the air to the radiation detector; and
a control unit configured to perform control for stopping the blowing unit in a case where the radiation detector performs a continuous imaging operation to continuously capture the image of the subject and a predetermined condition is satisfied.

2. The radiation imaging apparatus according to claim 1, wherein the control unit performs control for stopping the blowing unit when the radiation detector performs the continuous imaging operation to continuously capture the image of the subject and a predetermined time elapses after the continuous imaging operation starts.

3. The radiation imaging apparatus according to claim 1, further comprising:
an exterior member configured to surround the interior housing; and
a cooling unit disposed inside of the exterior member and outside of the interior housing and configured to cool the interior housing,
wherein the control unit further performs control for driving the cooling unit when the blowing unit is stopped.

4. The radiation imaging apparatus according to claim 3, further comprising:
a heat discharge unit, which is a part of the interior housing, configured to discharge air around the electrical component to outside the interior housing,
wherein the cooling unit blows air heated by the heat discharge unit to outside the exterior member through a ventilation hole provided on the exterior member.

5. The radiation imaging apparatus according to claim 4, wherein the cooling unit is a fan motor.

6. The radiation imaging apparatus according to claim 4, wherein the blowing unit is a fan motor.

7. The radiation imaging apparatus according to claim 1, further comprising a temperature detection unit configured to detect a temperature around the radiation detector,
wherein the control unit performs control for stopping the blowing unit when the temperature detected by the temperature detection unit exceeds a predetermined temperature.

8. The radiation imaging apparatus according to claim 7, further comprising:
an exterior member configured to surround the interior housing; and
a cooling unit disposed inside of the exterior member and outside of the interior housing and configured to cool the interior housing,
wherein the control unit further performs control for driving the cooling unit until the temperature detected by the temperature detection unit exceeds the predetermined temperature.

9. The radiation imaging apparatus according to claim 8, further comprising:
a heat discharge unit, which is a part of the interior housing, configured to discharge air around the electrical component to outside the interior housing,
wherein the cooling unit blows air heated by the heat discharge unit to outside the exterior member through a ventilation hole provided on the exterior member.

10. The radiation imaging apparatus according to claim 9, wherein the cooling unit is a fan motor.

11. The radiation imaging apparatus according to claim 7, further comprising:
an exterior member configured to surround the interior housing;
a cooling unit disposed inside of the exterior member and outside the interior housing and configured to cool the interior housing;
a first temperature detection unit configured to detect a temperature around the radiation detector; and
a second temperature detection unit configured to detect a temperature around the electrical component,
wherein the control unit further performs control for driving and stopping the cooling unit, and the control unit performs control for driving the blowing unit and stopping the cooling unit when a temperature detected by the first temperature detection unit does not exceed a predetermined first temperature and a temperature detected by the second temperature detection unit does not exceed a predetermined second temperature and performs control for stopping driving of the blowing unit when the temperature detected by the first temperature detection unit exceeds the predetermined first temperature.

12. The radiation imaging apparatus according to claim 1, further comprising a thermal insulation member disposed between the radiation detector and the electrical component.

13. The radiation imaging apparatus according to claim 1, wherein the control unit starts driving the blowing unit when an image of a subject is continuously captured.

14. The radiation imaging apparatus according to claim 1, wherein the blowing unit blows the air around the electrical component and directs the air to the radiation detector so as to change the temperature of the radiation detector.

15. The radiation imaging apparatus according to claim 1, wherein the blowing unit blows the air around the electrical component and towards the radiation detector so that the temperature of the radiation detector is raised.

16. A radiation imaging apparatus comprising:
- a radiation detector configured to capture an image of a subject by detecting radiation transmitted through the subject and converting the detected radiation into an image signal;
- an electrical component configured to process the image signal;
- an interior housing configured to accommodate the radiation detector and the electrical component therein;
- a fan motor disposed in the interior housing and configured to blow air around the electrical component and to direct the air to the radiation detector so as to change the temperature of the radiation detector; and
- a control unit configured to perform control for stopping the blowing unit in a case where the radiation detector performs a continuous imaging operation to continuously capture the image of the subject and a predetermined condition is satisfied.

17. The radiation imaging apparatus according to claim 16, wherein the control unit performs control for stopping the blowing unit in a case where the radiation detector performs the continuous imaging operation to capture the image of the subject and a predetermined time elapses after the continuous imaging operation starts.

* * * * *